United States Patent [19]

Ishikawa et al.

[11] Patent Number: 5,448,335
[45] Date of Patent: Sep. 5, 1995

[54] PHOTOGRAPHIC PROCESSING APPARATUS

[75] Inventors: Masazumi Ishikawa; Toru Tanibata, both of Wakayama, Japan

[73] Assignee: Noritsu Koki Co., Ltd., Wakayama, Japan

[21] Appl. No.: 202,253

[22] Filed: Feb. 25, 1994

[30] Foreign Application Priority Data

Mar. 22, 1993 [JP] Japan .................................. 5-061698

[51] Int. Cl.6 ............................................. G03B 27/52
[52] U.S. Cl. ................................................ 355/40; 271/6
[58] Field of Search .............................. 354/319–324, 354/354, 120; 355/40, 41, 54, 64, 68, 77; 271/3, 6, 12, 292, 294; 414/793.5, 794.4, 798.3

[56] References Cited

U.S. PATENT DOCUMENTS

| | | | |
|---|---|---|---|
| 4,293,215 | 10/1981 | Rosborough, Jr. et al. | 355/40 |
| 5,029,313 | 7/1991 | Robinson et al. | 355/40 |
| 5,159,385 | 10/1992 | Imura | 355/40 X |
| 5,184,227 | 2/1993 | Foley | 358/302 |
| 5,264,683 | 11/1993 | Yoshikawa | 235/375 |
| 5,281,993 | 1/1994 | Crochetierre et al. | 355/40 |

FOREIGN PATENT DOCUMENTS 0225991  6/1985  European Pat. Off. .
5011353  1/1993  Japan .

*Primary Examiner*—D. Rutledge
*Attorney, Agent, or Firm*—Armstrong, Westerman, Hattori, McLeland & Naughton

[57] ABSTRACT

A photographic processing apparatus adapted to put photographic prints and their corresponding index print together in ejecting these two types of prints made in different processes. The apparatus includes: an printing-development mechanism for photographic print; an index print making mechanism which reads the images of the developed film, arranges the images sequentially to display the same on at least one index print and ejects the index print through an index print outlet; and a print sorting device which sorts out the photographic prints and the index print corresponding thereto together. Time and labor for collation between the index print and the corresponding photographic prints can be dispensed with.

3 Claims, 5 Drawing Sheets

PHOTOGRAPHIC PROCESSING APPARATUS

BACKGROUND OF THE INVENTION

The present invention relates to a photographic processing apparatus and, more particularly, to a photographic processing apparatus adapted to put photographic prints and a corresponding index print together in ejecting these two types of prints formed by different processes.

Hitherto, an index print has been formed by a process (for example, digital printing) different from that for the corresponding photographic prints. Accordingly, a conventional photographic processing apparatus is provided with an index print forming mechanism which is arranged differently from an printing-development mechanism for photographic print, and is adapted to eject a plurality of photographic prints and their coresponging index print through different outlets. Such a conventional apparatus involves a problem that an operator must judge the correspondence between the index print and the photographic prints by his or her own sight with time and labor in order to put them together.

In view of the foregoing circumstance, an object of the present invention is to provide a photographic processing apparatus capable of putting an index print and its corresponding photographic prints together in ejecting these two types of prints, the index print being formed by a process different from an printing-development process for the photographic prints.

SUMMARY OF THE INVENTION

In accordance with the present invention, there is provided a photographic processing apparatus comprising: an printing-development mechanism for photographic print which performs an exposure to print respective images of frames of a developed film onto a photographic paper, develops the photographic paper and ejects respective photographic prints of the images through a photographic print outlet sequentially; an index print making mechanism which reads the images of the developed film, arranges the images sequentially to display the same on at least one index print and ejects the index print through an index print outlet; and a print sorting device which sorts out the photographic prints respectively having the images displayed on the index print and puts the index print and the photographic prints corresponding thereto together.

Preferably, the index print making mechanism includes a printer of a thermal sublimation type.

Further, preferably, the print sorting device includes a driver unit, a driving sprocket and a driven sprocket which are coupled with the driver unit, an endless chain wound around both the driving sprocket and the driven sprocket, and print receivers equidistantly spaced on the outer periphery of the endless chain and projecting outwardly therefrom which are capable of receiving the photographic prints and the index print and movable between the photographic print outlet and the index print outlet.

In the photographic processing apparatus of the present invention, when one group of photographic prints having been developed is ejected onto one of the print receivers of the print sorting device through the photographic print outlet, the print receivers move by a distance equal to the interval between two adjacent print receivers so that the print receiver loaded with that group of photographic prints is replaced with the next one. When the preceding receiver reaches the index print outlet, an index print corresponding to the group of photographic prints on the preceding receiver is ejected onto that receiver to be put together with the group of photographic prints.

DETAILED DESCRIPTION

A photographic processing apparatus according to the present invention will now be described in detail with reference to the attached drawings.

Figure 1:
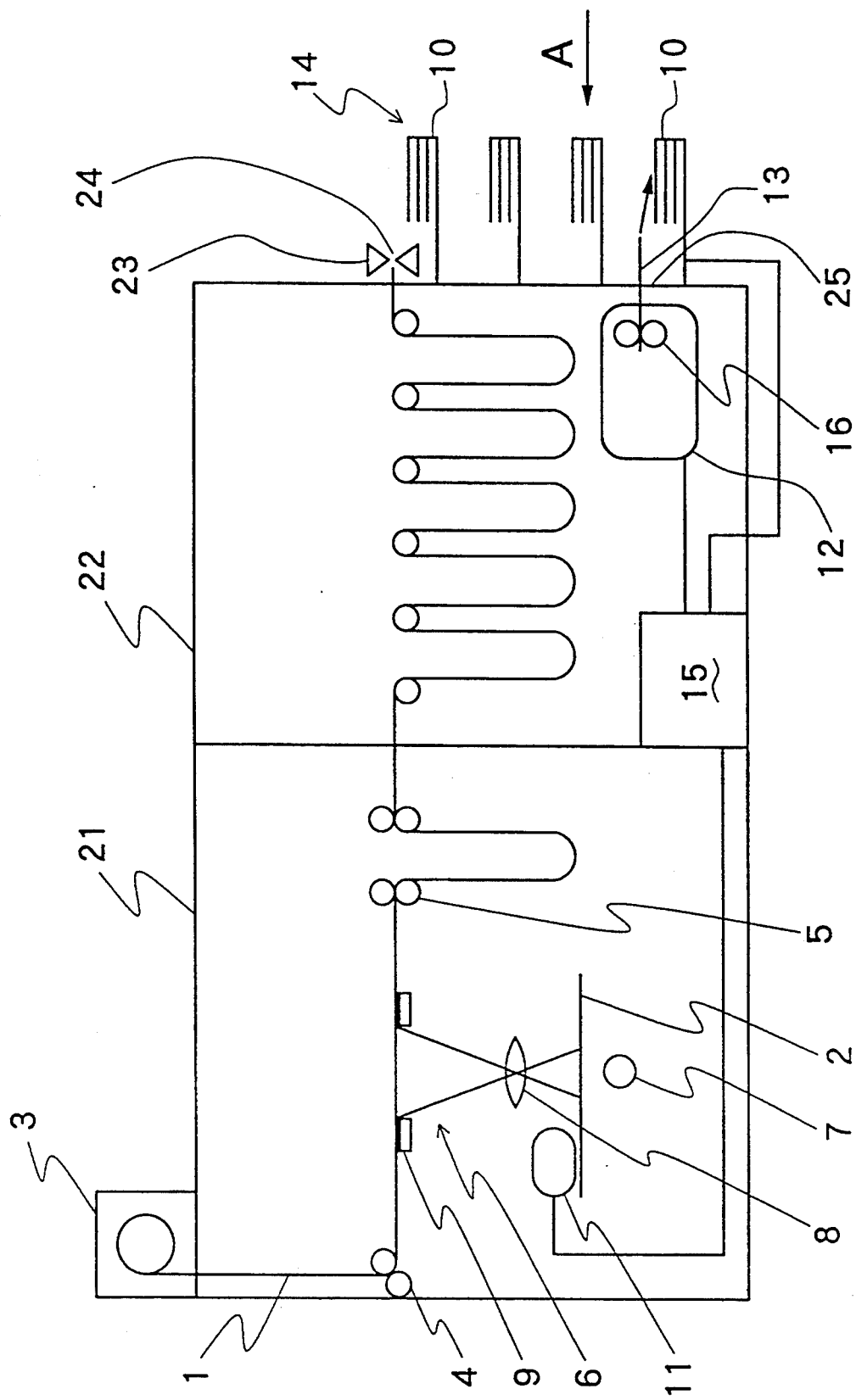
FIG. 1 is a schematic explanatory view showing one embodiment of a photographic processing apparatus of the present invention.

Referring to FIG. 1, a photographic processing apparatus embodying the present invention includes a printing part 21 and a development part 22. In this apparatus a printing-development mechanism for photographic print and an index print making mechanism are disposed side by side. Numeral 14 denotes a print sorting device.

To be described first is the printing-development mechanism for photographic print. This mechanism can employ an arrangement for exposure for conventional silver salt photography. Specifically, in the printing part 21 a photographic paper 1 in the form of a roll placed in a magazine 3 is drawn by a drawing roller unit 4 and positioned at an exposure stage 6 by paper masks 9. An image of a developed film 2 is exposed to light of a light source 7 through a lens 8 to be printed onto the photographic paper 1. The photographic paper 1 thus printed with the image is fed to the development part 22 by means of a conveyer roller unit 5. The photographic paper 1 thus developed in the development part 22 is separated into individual images with a cutter 23, then ejected to the print sorting device 14 through a photographic print outlet 24. Numeral 10 denotes photographic prints thus ejected into the print sorting device 14.

The index print making mechanism includes a film reader 11, a control part 15 and a thermal sublimation printer 12. The film reader 11 reads the images of the developed film 2 upon their printing on the photographic paper 1, and the control part 15 processes the data of the images so as to allow the thermal sublimation printer 12 to print out the images arranged on at least one print and feeds the thus processed data to the thermal sublimation printer 12. The thermal sublimation printer 12 makes an index print 13, which is then ejected to the print sorting device 14 through an index print outlet 25 by means of a feed roller unit 16.

It is noted that although the index print making mechanism according to the present embodiment uses a printer adapted for thermal sublimation printing, it might use, as well as the printer of such type, a printer of the type adapted for ink-jet printing, dry process of silver salt photography or the like.

This photographic processing apparatus is frequently installed along with a film development apparatus to respond to a request for developing a photographed film and, at the same time therewith, printing and developing photographic prints of the film. The index print displays the images of one roll of such a film which are arranged on at least one print, together with corresponding frame numbers if desired. With an ordinary color negative film, an image printed on a photographic print is reversed of the corresponding image of the negative film in brightness and hue. Hence, the content of the negative film is hard to identify by a usual sight. Nevertheless, the provision of the aforementioned index print allows not only the content of the film to be identified at a glance but also the frame number of an image to be specified with ease for, for example, making extra prints.

Figure 2:
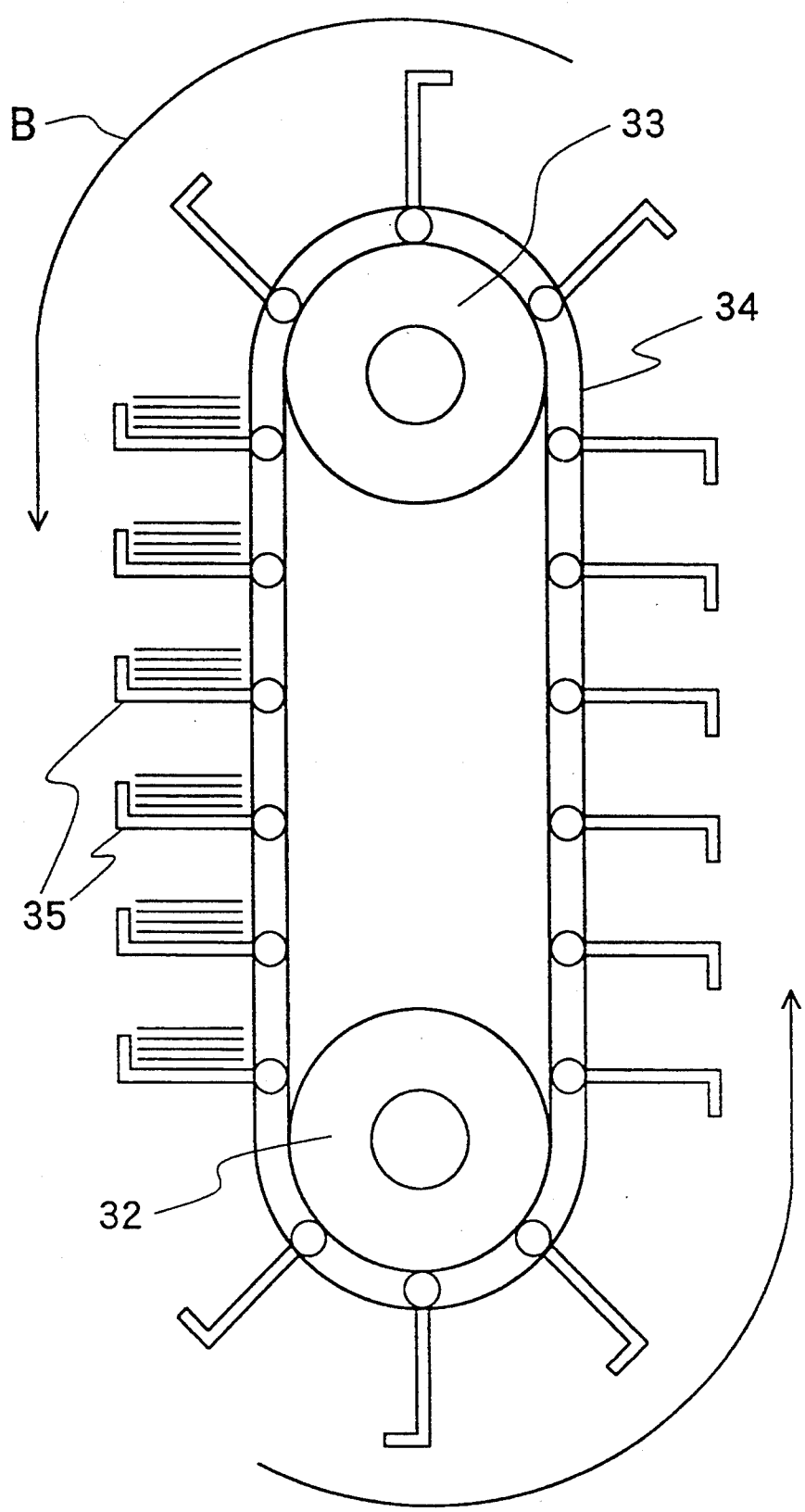
FIG. 2 is a side view of a print sorting device shown in FIG. 1.
Figure 3:
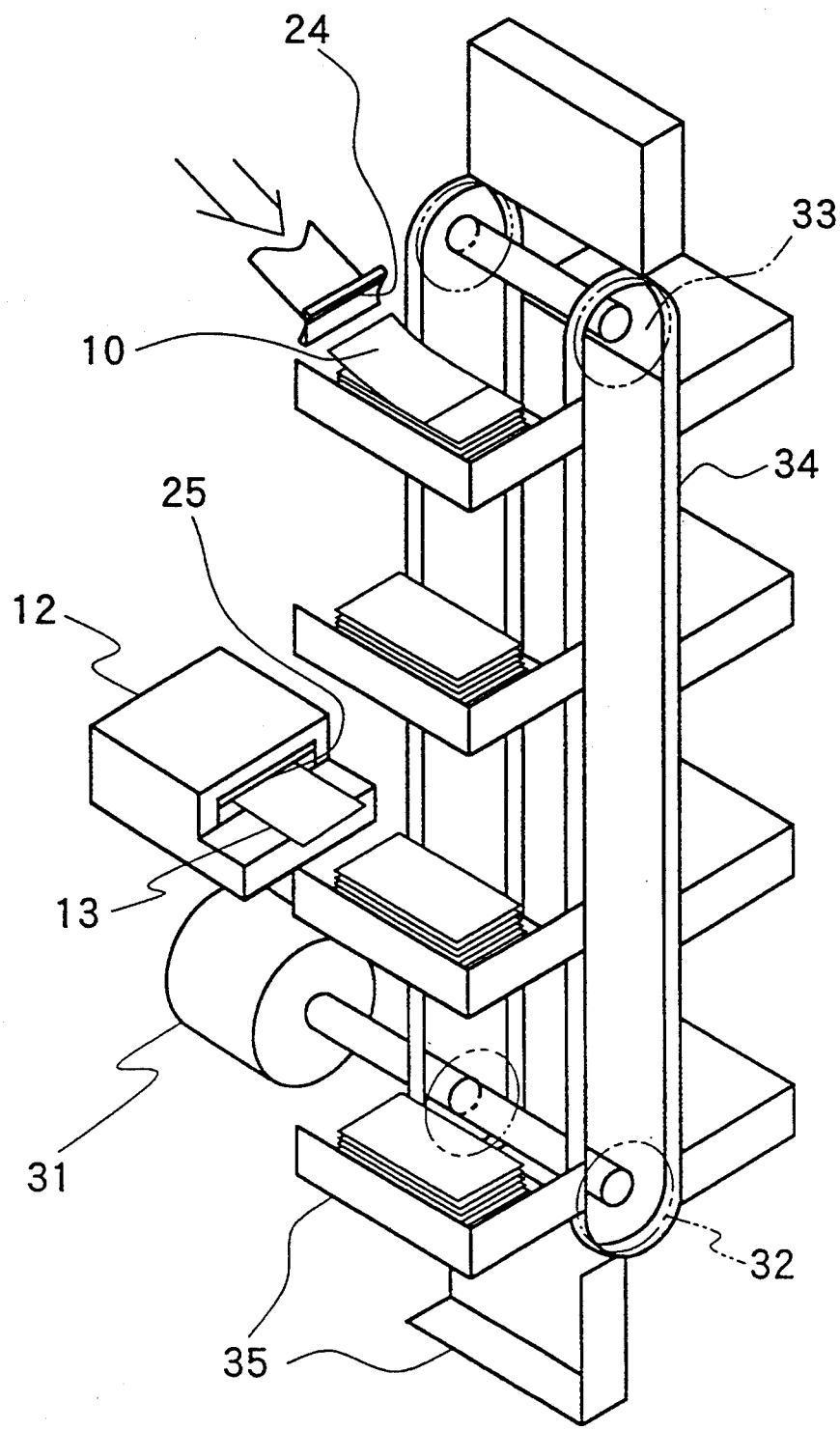
FIG. 3 is a perspective view of the print sorting device shown in FIG. 1.

To be described next is one example of the print sorting device 14 in the present invention. FIG. 2 illustrates the print sorting device 14 viewed from the direction A in FIG. 1, and FIG. 3 illustrates the device 14 in perspective.

The print sorting device 14 includes a driver unit 31, a driving sprocket 32 and a driven sprocket 33 which are coupled with the driver unit 31, an endless chain 34, and print receivers 35.

Each print receiver 35 is of a substantially box-like configuration for receiving prints ejected through the photographic print outlet 24 and the index print outlet 25 and has an open side on the outlet side. These print receivers 35 are mounted on the outer periphery of the endless chain 34 as equidistantly spaced from one another and turn around in the direction indicated by arrow B by a distance equal to the interval between two adjacent print receivers every time the driver unit 31 is actuated.

Since the photographic print outlet 24 and the index print outlet 25 are disposed vertically relative to each other, the driving sprocket 32 and the driven sprocket 33 are also disposed vertically relative to each other so as to permit each receiver to move between the outlets 24 and 25.

The operation of the print sorting device 14 is as follows. Photographic prints 10 ejected from the photographic print outlet 24 are received by each print receiver 35 in a stacked fashion. When all the photographic prints 10 of, for example, one roll of film are ejected with their data for index print being read by the film reader 11 and fed to the control part 15, the driver unit 31 is actuated to move the print receivers 35 downwardly by a distance equal to the interval between two adjacent receivers. When the print receiver 35 loaded with the photographic prints 10 descends to the index print outlet 25 by repeating the above-mentioned operation more than once, the index print 13 corresponding to the photographic prints 10 is ejected to the print receiver 35, so that the photographic prints 10 and the corresponding index print 13 are put together.

It is to be noted that the timing between the turning of the print sorting device 14 and the ejection of the index print 13 is controlled by the control part 15.

Figure 4:
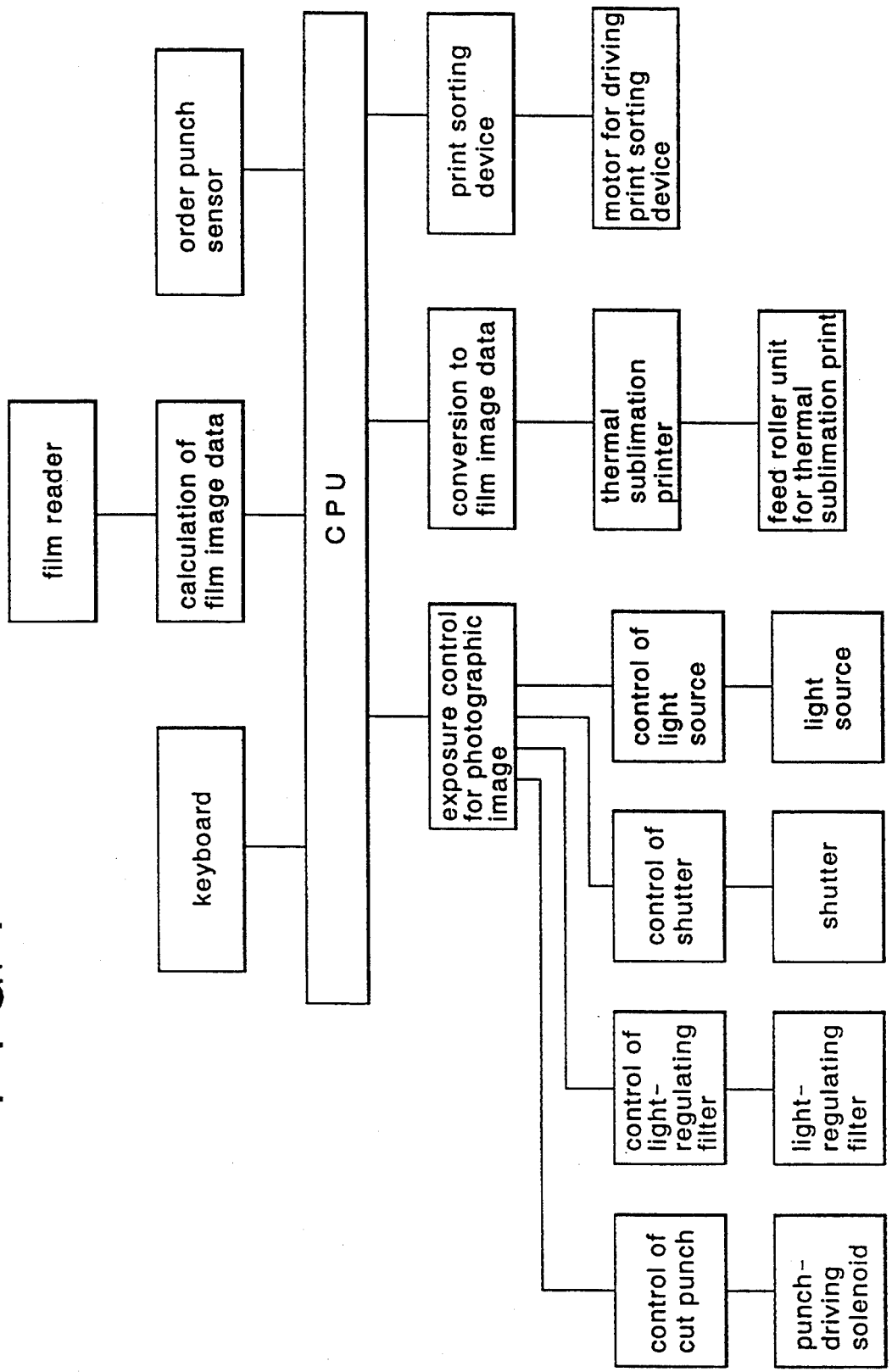
FIG. 4 is a control block diagram of the photographic processing apparatus of the present invention.

The description is then made on this control part. FIG. 4 is a control block diagram and FIG. 5 is a flow-chart of control.

As shown in FIG. 4, exposure control for photographic image controls the optical system components such as a light-regulating filter, shutter and light source and the conveyer system components such as the drawing roller unit 4 and the conveyer roller unit 5 to achieve printing and development of the photographic paper 1. Then, control of cut punch actuates a punch-driving solenoid to cut the photographic paper 1 image by image. On the other hand, the film reader 11 reads the film data of one roll of film from the developed film 2, followed by calculation of film image data from the film data by CPU. A keyboard allows an entry of information, such as a comment, to be displayed on the index print as well as an entry of an instruction for an operation such as starting of exposure. Then, an order punch sensor detects the fact that all the photographic prints 10 of one roll of film have been ejected to the print sorting device 14. The print sorting device 14 then advances by a distance equal to the interval between two adjacent receivers. The index print 13 made by the thermal sublimation printer 12 after the conversion of the film data to the film image data is ejected by means of the feed roller 16 at an appropriate timing.

Figure 5:
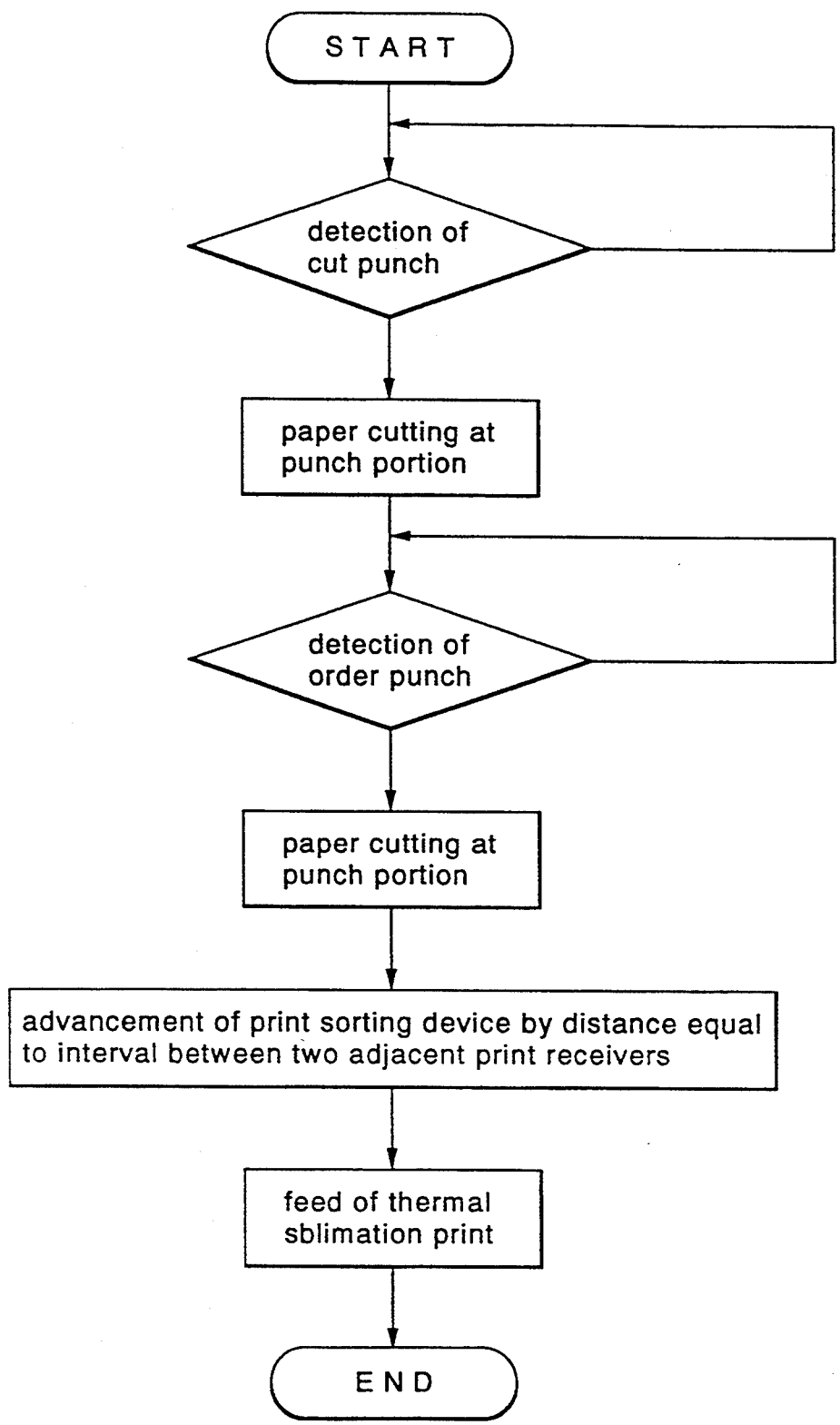
FIG. 5 is a flowchart for controlling the photographic apparatus of the present invention.

As shown in FIG. 5, upon detection of the cut punch, the cutter 23 is actuated to cut the photographic paper 1 just at a boundary between adjacent images. When this operation is repeated several times and the order punch sensor detects the fact that the cutting operation has been completed for one roll of film, the print sorting device 14 advances by a distance equal to the interval between two adjacent print receivers. On the other hand, upon completion of photographic printing for one roll of film, the conversion of the film data to the film image data starts and the thermal sublimation printer 12 make the index print 13. When the print receiver 35 loaded with the photographic prints 10 descends to the index print outlet 25, the feed roller unit 16 is actuated to eject the index print 13 onto the corresponding photographic prints 10.

It should be understood that the index print might represent all the frames of one roll of film or several frames thereof. In the case of the latter, a plurality of index prints are needed for one roll of film.

As has been described, the photographic processing apparatus of the present invention automatically puts together an index print and its corresponding photographic prints which are formed by different processes. Hence, the photographic apparatus dispenses with time and labor for collation between an index print and the corresponding photographic prints.

While only certain presently preferred embodiments have been described in detail, as will be apparent with those familiar with the art, certain changes and modifications can be made without departing from the spirit and scope of the invention as defined by the following claims.

What is claimed is:

1. A photographic processing apparatus comprising: an printing-development mechanism for photographic print which performs an exposure to print respective images of frames of a developed film onto a photographic paper, develops the photographic paper and ejects respective photographic prints of the images through a photographic print outlet sequentially; an index print making mechanism which reads the images of the developed film, arranges the images sequentially to display the same on at least one index print and ejects the index print through an index print outlet; and a print sorting device which sorts out the photographic prints respectively having the images displayed on the index print and puts the index print and the photographic prints corresponding thereto together, said print sorting device including a driver unit, a driving sprocket and a driven sprocket which are coupled with the driver unit, an endless chain wound around both the driving sprocket and the driven sprocket, and print receivers equidistantly spaced on the outer periphery of the endless chain and projecting outwardly therefrom which are each capable of receiving said photographic prints and said index print and movable between said photographic print outlet and said index print outlet.

2. The photographic processing apparatus of claim 1, wherein said index print making mechanism includes a printer of a thermal sublimation type.

3. The photographic processing apparatus of claim 2, wherein said print sorting device includes a drive unit, a driving sprocket and a driven sprocket which are coupled with the drive unit, an endless chain wound on both the sprocket and the driven sprocket, and print receivers equidistantly spaced on the outer periphery of the endless chain and projecting outwardly therefrom which are each capable of receiving said photographic prints and said index print and movable between said photographic print outlet and said index print outlet.

* * * * *